US007411545B2

(12) United States Patent  
Dutton

(10) Patent No.: US 7,411,545 B2
(45) Date of Patent: Aug. 12, 2008

(54) CARRIER PHASE INTERGER AMBIGUITY RESOLUTION WITH MULTIPLE REFERENCE RECEIVERS

(75) Inventor: Kevin E. Dutton, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/537,247

(22) Filed: Sep. 29, 2006

(65) Prior Publication Data

US 2008/0088504 A1    Apr. 17, 2008

(51) Int. Cl.
G01S 5/14 (2006.01)

(52) U.S. Cl. .............................. 342/357.04; 342/357.08
(58) Field of Classification Search ............ 342/357.04, 342/357.06, 357.08, 357.12; 701/213, 215
See application file for complete search history.

(56) References Cited

U.S. PATENT DOCUMENTS

| 4,032,759 | A |   | 6/1977  | Danik |
| 4,232,313 | A |   | 11/1980 | Fleishman |
| 5,432,520 | A |   | 7/1995  | Schneider et al. |
| 5,438,337 | A |   | 8/1995  | Aguado |
| 5,488,563 | A |   | 1/1996  | Chazelle et al. |
| 5,570,097 | A |   | 10/1996 | Aguado |
| 5,572,218 | A | * | 11/1996 | Cohen et al. ........... 342/357.06 |
| 5,638,282 | A |   | 6/1997  | Chazelle et al. |
| 5,757,317 | A |   | 5/1998  | Buchler et al. |
| 5,991,691 | A |   | 11/1999 | Johnson |
| 6,005,514 | A | * | 12/1999 | Lightsey ..................... 342/365 |
| 6,246,960 | B1 |  | 6/2001  | Lin |
| 6,792,380 | B2 | * | 9/2004 | Toda .......................... 702/151 |
| 6,831,599 | B2 |  | 12/2004 | Morgan |
| 6,836,707 | B2 |  | 12/2004 | Sowada et al. |
| 2002/0033769 | A1 | | 3/2002 | Bass et al. |
| 2003/0040852 | A1 | | 2/2003 | Green et al. |
| 2004/0036650 | A1 | | 2/2004 | Morgan |
| 2005/0055143 | A1 | | 3/2005 | Doane |
| 2005/0114023 | A1 | | 5/2005 | Williamson et al. |
| 2005/0211083 | A1 | | 9/2005 | Waid et al. |
| 2006/0074558 | A1 | | 4/2006 | Williamson et al. |

OTHER PUBLICATIONS

Bosely et al., "Demonstration System for Using Shipboard-Relative GPS", "GPS WORLD", Apr. 1, 2005.

Joosten et al., "Fixing the Ambiguities: Are You Sure", "GPS SOLUTIONS", Nov. 2002, vol. 6, No. 1-2.

De Lorenzo et al., "GPS Attitude Determination for a JPALS Testbed: Integer Initialization and Testing", "IEEE Position Location and Navigation Symposium, Monteray, CA", Apr. 2004, Publisher: IEEE.

Teunissen, "The Least-Squares Ambiguity Decorrelation Adjustment: A Method for Fast GPS Integer Ambiguity Estimation", "Journal of Geodesy", 1995, pp. 65-82, vol. 70, Publisher: Springer-Verlag.

(Continued)

Primary Examiner—Dao Phan

(57) ABSTRACT

A method to determine a relative position between antennae comprising generating phase carrier measurements for a carrier frequency and at least three antennae including a master antenna and other antennae, generating phase integer sets based on the phase carrier measurements, and calculating a relative position between the master antenna and at least one other antenna based on the generated phase integer sets and a fixed baseline between two of the other antennae.

20 Claims, 4 Drawing Sheets

OTHER PUBLICATIONS

Gerard Lachapelle et al.; Precise Aircraft-to-Aircraft Positioning using a Multiple Receiver Configuration; Proceedings of the 1994 National Technical Meeting of the Institute of Navigation; Jan. 24, 1994; pp. 793-799; San Diego, CA.

J.A. Doutt et al.; Determination of Distance Between a Moving Ship and Drifting Buoys to Centimeter-Level Accuracy at Sea Using L1 Phase GPS Receivers and Differential Moving Base Kinematic Processing; Proceedings of the 11 th Int'l Technical Meeting of the Satellite Division of the Institute of Navigation; Sep. 15, 1998; pp. 1301-1306; Nashville, TN.

S. Weisenburger and M.E. Cannon; Performance improvements Using Constraints in Marine OTF Ambiguity Resolution; Proceedings of the 1997 Nat'l Technical Meeting of the Institute of Navigation; Jan. 14, 1997; pp. 585-594; Santa Monica, CA.

Moon-Beom Heo et all; Robust airborne navigation algorithyms for SRGPS; Position Location and Navigation Symposium, 2004; pp. 175-183; Piscataway, NJ.

* cited by examiner

CARRIER PHASE INTERGER AMBIGUITY RESOLUTION WITH MULTIPLE REFERENCE RECEIVERS

RELATED APPLICATIONS

This application is related to U.S. patent application Ser. No. 11/180,295 having a title of "METHODS AND SYSTEMS OF RELATIVE NAVIGATION FOR SHIPBOARD LANDINGS" (also referred to here as the "Ser. No. 11/180, 295 application") filed on the Jul. 13, 2005. The application Ser. No. 11/180,295 is hereby incorporated herein by reference.

BACKGROUND

Existing requirements for providing precision approach and landing navigation during flight for both commercial and military aircraft include accuracy, integrity, availability, and continuity of function. Traditionally, location determination incorporates the use of global positioning system (GPS)-based satellite navigation that can provide accuracy down to the centimeter level. The integrity of a navigation system is typically expressed in terms of confidence levels. The higher the confidence level, the more reliable the information provided. Availability and continuity provide assurances that the system will be available not only at the beginning of the operation, but throughout the entire duration of the flight.

Meeting these requirements is especially crucial for autonomous shipboard landings on seaborne aircraft carriers. Proposals of using GPS to generate relative navigation and guidance to meet these challenges can provide the accuracy and integrity required, however, a shipboard approach and landing is more demanding than typical land-based approaches and landings. Aircraft navigation systems used in a shipboard approach and landing must continue to meet the requirements listed above even at sea under severe weather conditions and demanding electromagnetic environments. This is particularly important when landing on an aircraft carrier, where vertical landing errors of more than 0.3 meters is unacceptable and can result in unsafe landing conditions.

Some of the factors to consider during autonomous shipboard landings are a lack of visibility, operating under combat conditions, and a dynamically changing touchdown point. In addition to low rate GPS measurement data other, higher rate, measurements are needed in order to evaluate the relative state between aircraft and aircraft carrier, i.e., the aircraft's position and velocity with respect to the moving runway and touchdown point, as accurately as possible during a precision approach and landing. Existing navigational aids include using an inertial navigation system (INS) to measure the position and altitude of the approaching aircraft in conjunction with GPS. With a combination GPS/INS solution, the short-term measurement data from the INS, which is susceptible to drift errors over time, is corrected by the exact location and time references provided by satellite navigation.

Rapid and high-precision positioning with a Global Navigation Satellite System (GNSS) is feasible only when very precise carrier-phase observations can be used. Raw carrier phase measurements are generally the by-product of all GPS receivers. These phase measurements cannot be used as "range" observations because they are ambiguous.

Carrier phase measurements are ambiguous by an unknown, integer number of cycles. These integer ambiguity parameters need to be resolved before carrier-phase observations can begin to serve as very precise range measurements. For precise navigation, reliable real-time ambiguity resolution is necessary. For short-distance baseline, with current GPS, the reliability of ambiguity resolution with single-epoch data is not high. This makes it impossible to realize real-time precise navigation for safety-related applications. For medium- and long-distance baselines, with current GPS, it generally takes more than twenty minutes to get reliable ambiguity resolution. This low efficiency makes it impossible for global positioning system to be used in many applications where both high precision and high efficiency are needed.

SUMMARY

A first aspect of the present invention includes a method to determine a relative position between antennae comprising generating phase carrier measurements for a carrier frequency and at least three antennae including a master antenna and other antennae, generating phase integer sets based on the phase carrier measurements, and calculating a relative position between the master antenna and at least one other antenna based on the generated phase integer sets and a fixed baseline between two of the other antennae.

DRAWINGS

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
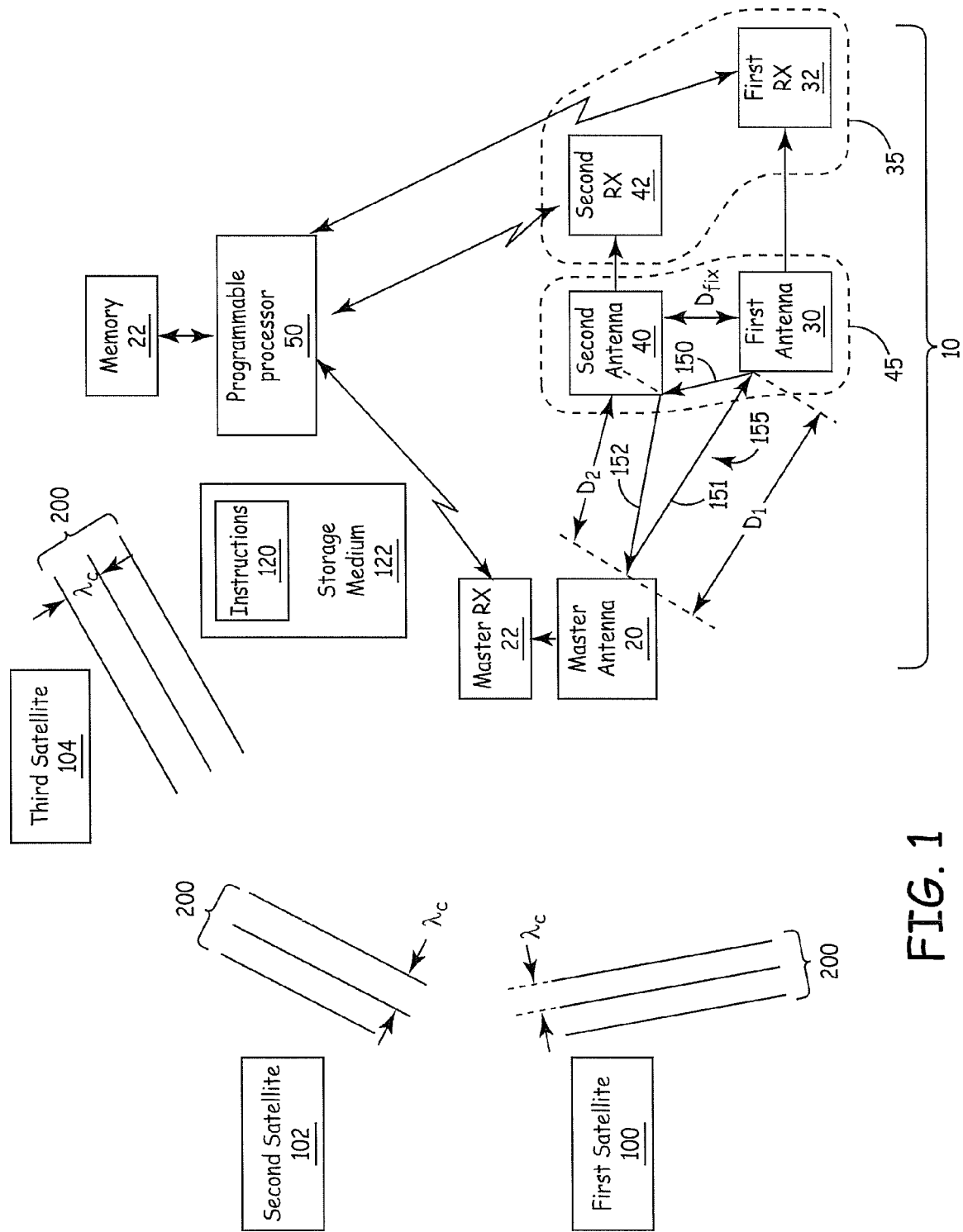
FIG. 1 is a block diagram of one embodiment of a system in accordance with the present invention.

FIG. 1 is a block diagram of one embodiment of a system 10 in accordance with the present invention. System 10 comprises at least three antennae, such as a master antenna 20, and at least two other antennae represented generally by the numeral 45. As shown in FIG. 1, the other antennae 45 include a first antenna 30 and a second antenna 40. The system 10 also includes a master receiver 22, and other receivers represented generally by the numeral 35. As shown in FIG. 1, the other receivers 35 comprise a first receiver 32 and a second receiver 43. The system 10 also includes a programmable processor 50, a memory 28, and instructions 120, e.g., software, firmware or other program code. The instructions 120 are stored in a storage medium 122. The master receiver 22, the other receivers 35, and the memory 28 are communicatively coupled to the programmable processor 50. In one implementation of this embodiment, the other receivers 35 are communicatively coupled to the programmable processor 50 via a wireless communication link (for example, a radio-frequency (RF) communication link). In another implementation of this embodiment, the other receivers 35 are communicatively coupled to the programmable processor 50 via a wired (for example, an optical fiber or copper wire communication link) and wireless communication link.

In yet another implementation of this embodiment, the master receiver 22 is communicatively coupled to the programmable processor 50 via a wireless communication link. In yet another implementation of this embodiment, the master receiver 22 is communicatively coupled via a wired communication link. In yet another implementation of this embodiment, the master receiver 22 is communicatively coupled via a wired and a wireless communication link. In yet another implementation of this embodiment, at least one Kalman filter is included in the instructions 120 executed by the programmable processor 50.

A plurality of navigational satellites 100, 102, and 104 emit global positioning system signals, the wavefronts of which are shown and represented generally by the numeral 200 (also referred to herein as "signals 200"). The signals 200 are transmitted at a carrier frequency $v_c$ that is equal to the speed of light divided by the carrier wavelength $\lambda_c$. The master antenna 20, the first antenna 30, and the second antenna 40 each receive the global positioning system signals 200 from the plurality of navigational satellites 100, 102, and 104 within range of the antennae 20, 30, and 40. The master antenna 20 is also referred to herein as "user antenna 20" and the other antennae 45 are also referred to herein as "slave antennae 45," or "reference antennae 45." In one implementation of this embodiment, the plurality of navigational satellites 100, 102, and 104 are included in the system 10.

The master receiver 22 is communicatively coupled to the master antenna 20. The master receiver 22 tracks and demodulates the signals 200 received at the master antenna 20 from the plurality of navigational satellites 100, 102, and 104. The master receiver 22 creates pseudo-range data and carrier phase measurement responsive to receiving the global positioning system signals 200. The pseudo-range data and carrier phase measurements generated at the master receiver 22 are sent to the programmable processor 50. In one implementation of this embodiment, the master antenna 20, the master receiver 22 and the programmable processor 50 are co-located. In another implementation of this embodiment, the master antenna 20, the master receiver 22 and the programmable processor 50 are co-located in an aircraft.

At least two other receivers 35, also referred to herein as "first receiver 32 and second receiver 42," are communicatively coupled to a respective one of the other antennae 45. Each of the other receivers 35 tracks and demodulates the signals 200 received from the plurality of navigational satellites 100, 102 and 104 at an associated other antennae 45. Each of the other receivers 35 creates pseudo-range data and carrier phase measurements for the associated other antennae 45. The pseudo-range data and carrier phase measurements generated at the other receivers 35 are sent to the programmable processor 50.

For the exemplary implementation shown in FIG. 1, the first receiver 32 is communicatively coupled to antenna 30. The first receiver 32 tracks and demodulates the signals 200 received at the first antenna 30 from the plurality of navigational satellites 100, 102 and 104. The first receiver 32 creates pseudo-range data and carrier phase measurements for the first antenna 30 and sends the generated pseudo-range data and carrier phase measurements to the programmable processor 50. Likewise, the second receiver 42 is communicatively coupled to antenna 40. The second receiver 42 tracks and demodulates the signals 200 received at the second antenna 40 from the plurality of navigational satellites 100, 102 and 104. The second receiver 42 creates pseudo-range data and carrier phase measurements for the second antenna 40 and sends the generated pseudo-range data and carrier phase measurements to the programmable processor 50.

Each of the other antennae 45 forms a baseline with the master antenna 20. The first antenna 30 forms a first baseline $D_1$ with the master antenna 20. The first baseline $D_1$ is directionally represented as a first baseline vector 151 from the master antenna 20 to the first antenna 30. The second antenna 40 forms a second baseline $D_2$ with the master antenna 20. The second baseline $D_2$ is directionally represented as second baseline vector 152 from the second antenna 40 to the master antenna 20. At least two of the other antennae 45 also form a fixed baseline $D_{fix}$ with each other. The fixed baseline $D_{fix}$ is directionally represented as fixed baseline vector 150 from the first antenna 30 to the second antenna 40. The first baseline vector 151, the second baseline vector 152, and the fixed baseline vector 150 form a closed triangle represented generally by the numeral 155.

The programmable processor 50 receives the generated pseudo-range data and carrier phase measurements from the master receiver 22, the first receiver 32, and the second receiver 42. The programmable processor generates phase integer sets based on the phase carrier measurements and calculates a relative position between the master antenna 20 and at least one other antenna 45 based on the fixed baseline $D_{fix}$ between two of the other antennae 45. The processor 50 executes instructions 120 to analyze the raw pseudo-range data and the carrier phase data received from the receivers 22, 32, and 42. A phase integer set is generated for each of the first baseline $D_1$ and the second baseline $D_2$.

In an exemplary case, if there are eight navigational satellites sending the signals 200 at the carrier frequency $v_c$, then the receivers 22, 32, and 42 process the received signals 200 through eight channels and send the raw data from the eight channels to the programmable processor 50. The programmable processor 50 processes the raw data from the eight channels from the three receivers 22, 32, and 42 to generate one integer for each of the eight channels. These eight integers are processed to form a 1×8 vector array, which is the phase integer set.

The software used to generate the phase integer sets and the methods to generate phase integer sets are known by one of ordinary skill in the art. The generation of phase integer sets is described in "The least-squares ambiguity decorrelation adjustment: a method for fast GPS integer ambiguity estimation" by P. J. G. Teunissen published in the Journal of Geodesy (1995) 70:65-82 referred to herein as the Teunissen paper.

Figure 3:
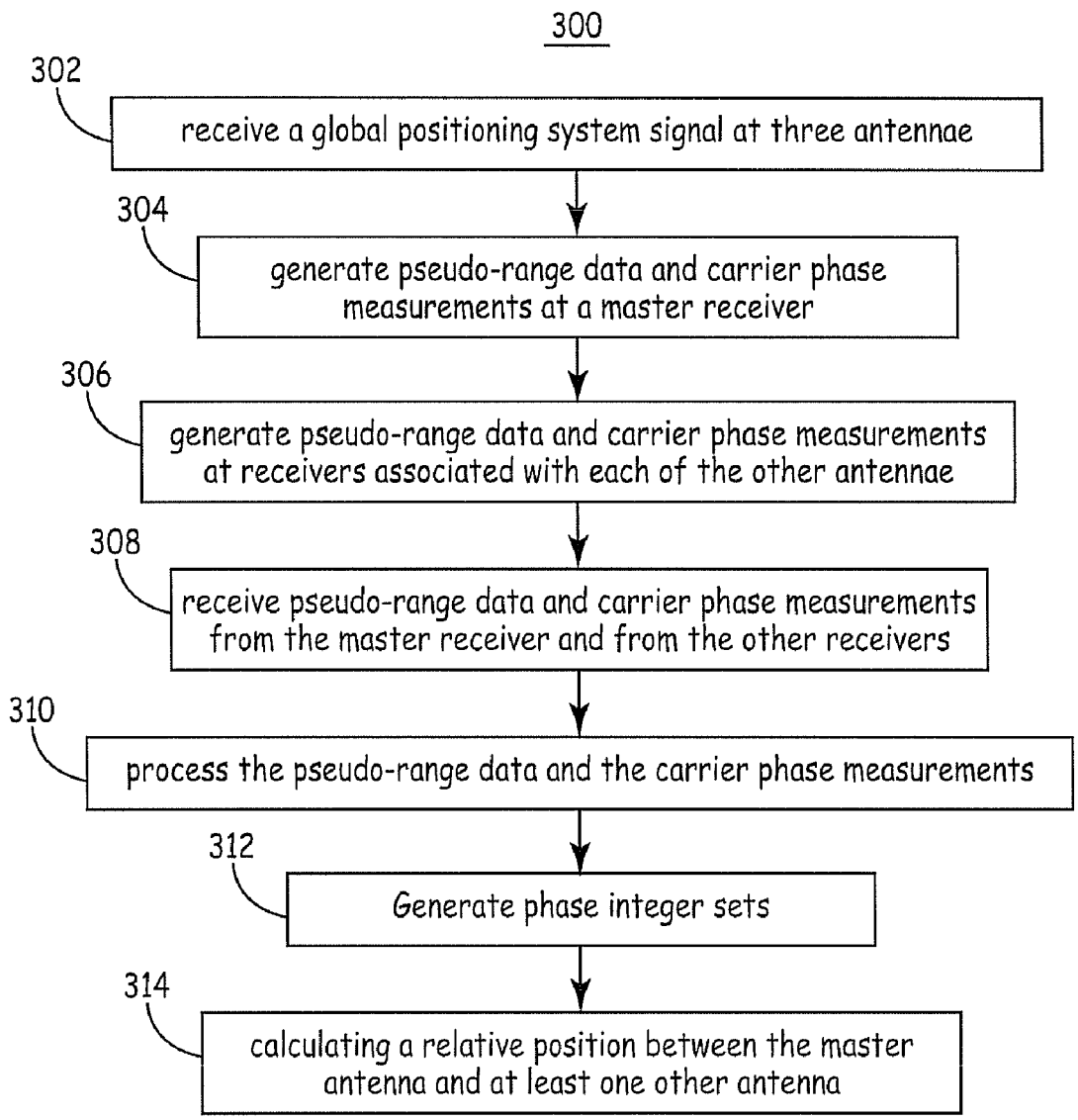
FIG. 3 is a flow diagram of one embodiment of a method to determine a relative position between antennae in accordance with the present invention.
Figure 4:
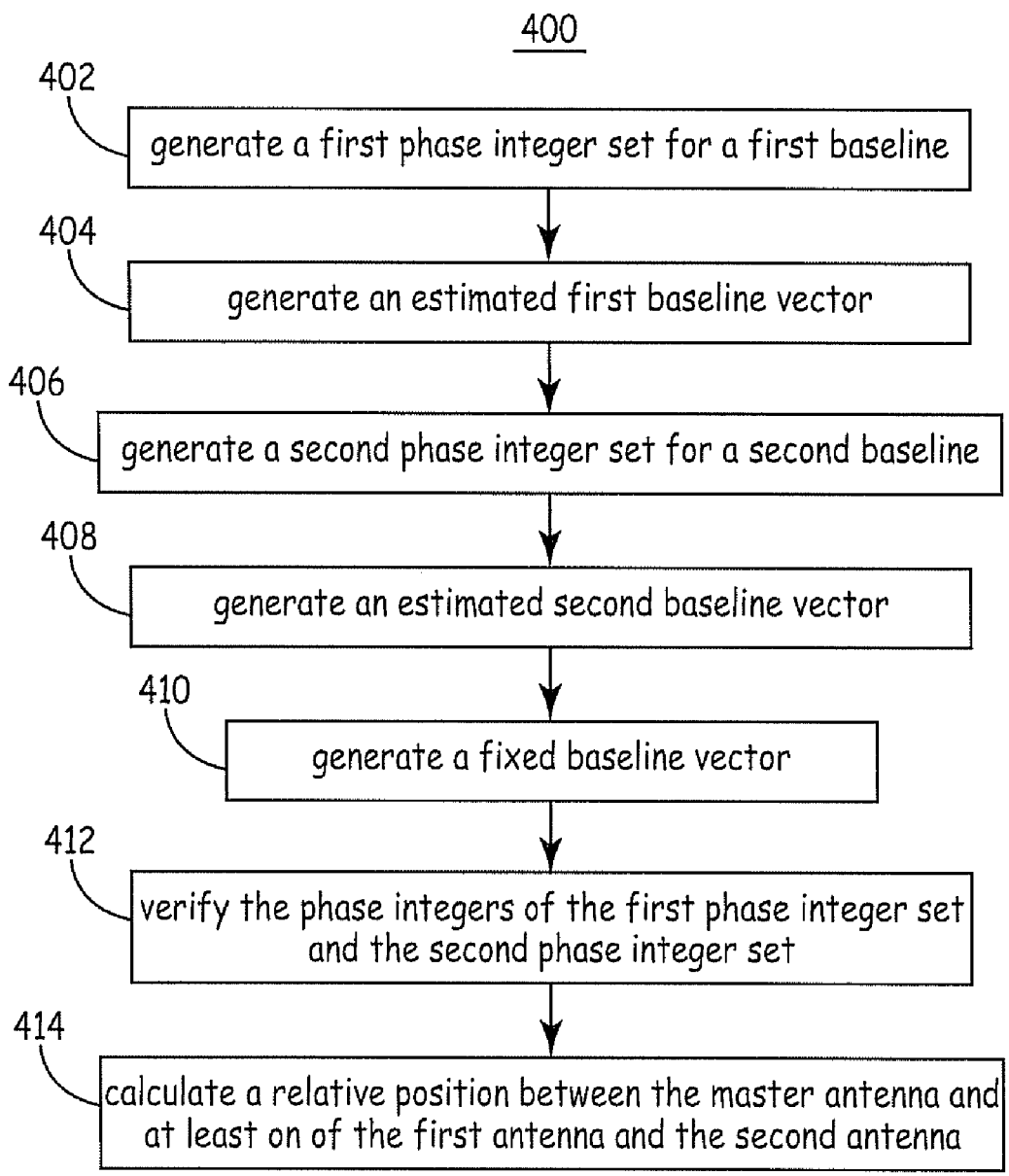
FIG. 4 is a flow diagram of one embodiment of a method to determine a relative position between a master antenna and either a first antenna or a second antenna in accordance with the present invention.

The programmable processor 50 calculates a relative position between the master antenna 20 and either the first antenna 30 or the second antenna 40 based on the phase integer sets and the fixed baseline 159 as described in detail below with reference to methods 300 and 400 as shown in FIGS. 3 and 4, respectively.

Figure 2:
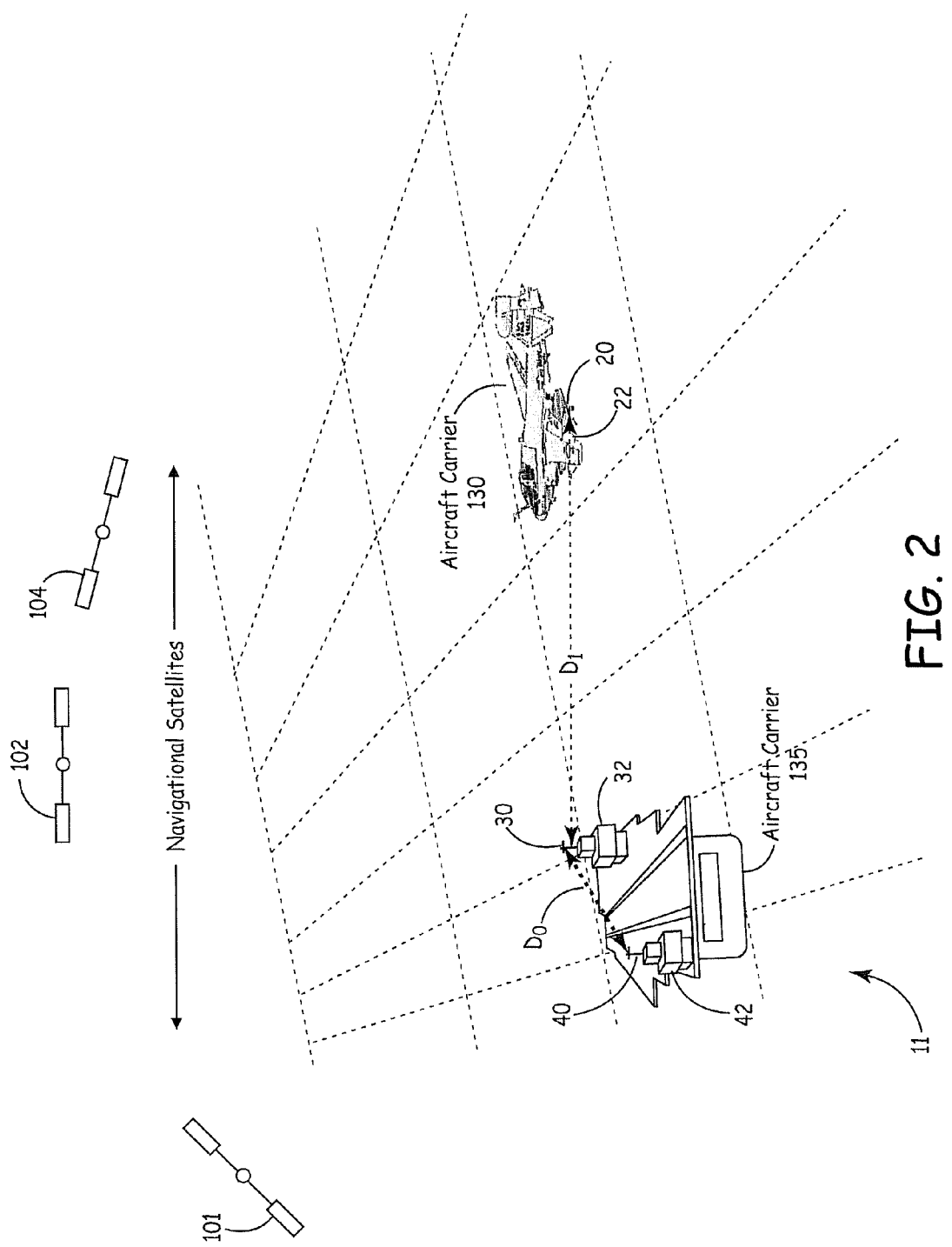
FIG. 2 shows one embodiment of an implementation of a system in accordance with the present invention.

FIG. 2 shows one embodiment of an implementation of a system 11 in accordance with the present invention. System 11 incorporates system 10 (FIG. 1), an aircraft 130, and an aircraft carrier 135. In system 11, the master antenna 20 and master receiver 22 are positioned in an aircraft 130 and the other antennae 45 and the associated other receivers 35 are positioned on an aircraft carrier 135. In another embodiment, the other antennae 45 are positioned on a moving vehicle. In another implementation of this embodiment, the plurality of navigational satellites 100, 102, and 104 are included in the system 11.

In yet another implementation of this embodiment, two antennae are positioned a fixed distance from each other in or on the aircraft 130 and a second antenna is positioned on the aircraft carrier 135. For example, the master antenna 20 and the first antenna 30 are positioned at ends of a fixed baseline on the aircraft 130 while the third antenna 40 is located on the aircraft carrier 135. In this case, the programmable processor 50 is located in the aircraft 130.

FIG. 3 is a flow diagram of one embodiment of a method 300 to determine a relative position between antennae in accordance with the present invention. The embodiment of method 300 is described as being implemented using system 10 of FIG. 1. In such an embodiment, at least a portion of the processing of method 300 is performed by instructions 120 executing on the programmable processor 50, which is communicatively coupled to the master receiver 22, first receiver 32 and second receiver 42.

At block 302, a global positioning system signal is received at tliree antennae. The received signal is sent from each antenna to a communicatively coupled receiver. The communicatively coupled receiver processes the received signal. In one implementation of this embodiment, the global positioning system signals 200 emitted from a plurality of satellites 100, 102 and 104 are received at the master antenna 20, the first antenna 30 and the second antenna 40 (FIG. 1). The received signal 200 is sent from the master antenna 20, the first antenna 30 and the second antenna 40 to the respective master receiver 22, the first receiver 32 and the second receiver 42 for processing by the respective receiver.

At block 304, the master receiver generates pseudo-range data and carrier phase measurements responsive to receiving the global positioning system signal from the master antenna. In one implementation of this embodiment, the master receiver 22 generates pseudo-range data and carrier phase measurements responsive to the master antenna 20 receiving the global positioning system signal 200 and sending it to the master receiver 22.

At block 306, the pseudo-range data and carrier phase measurements are generated at receivers associated with each of the other antennae in response to the other antennae receiving the global positioning system signal and sending it to the associate receiver. In one implementation of this embodiment, the pseudo-range data and carrier phase measurements are generated at the other receivers 35 responsive to the other antennae 45 receiving the global positioning system signal 200 and sending it to an associated other receiver 35.

At block 308, the pseudo-range data and carrier phase measurements are received from the master receiver and from the other receivers responsive to the generating of the pseudo-range data and the carrier phase measurements. In one implementation of this embodiment, the programmable processor 50 receives the pseudo-range data and carrier phase measurements from the master receiver 22 and from the other receivers 35 when the pseudo-range data and the carrier phase measurements are generated at the master receiver 22, and the other receivers 35.

At block 310, the pseudo-range data and the carrier phase measurements generated at the antennae are processed. In one implementation of this embodiment, the programmable processor 500 executes instructions 120 stored in the storage medium 122 to process the pseudo-range data and the carrier phase measurements generated at master antenna 20 and other antennae 45.

At block 312, phase integer sets are generated as a result of the processing at block 310. In one implementation of this embodiment, the programmable processor 50 generates the phase integer sets.

At block 314, a relative position between the master antenna and at least one other antenna is calculated based on the generated phase integer sets and a fixed baseline between two of the other antennae. In one implementation of this embodiment, the programmable processor 50 calculates the relative position between the master antenna 20 and at least one of the other antennae 45. The calculation is based on the generated phase integer sets and a fixed baseline $D_{fix}$ between two of the other antennae 45. The method 400 of FIG. 4 describes how the fixed baseline $D_{fix}$ is used with the phase integer sets to calculate the relative position between the master antenna 20 and at least one of the other antennae 45.

Since method 300 relies on carrier frequency measurements and not on code measurement, method 300 precisely determines the relative position between the master antenna 20 and at least one of the other antennae 45, since phase carrier measurements have lower noise levels and smaller multi-path errors than code measurements. By continuously implementing method 300, the programmable processor 50 in the aircraft 130 that is landing on the aircraft carrier 134 continuously determines the relative position of the aircraft carrier 135 to within a few centimeters.

FIG. 4 is a flow diagram of one embodiment of a method 400 to determine a relative position between a master antenna 20 and either a first antenna 30 or a second antenna 40 in accordance with the present invention. The embodiment of method 400 is described as being implemented using system 10 of FIG. 1. In such an embodiment, at least a portion of the processing of method 400 is performed by instructions 120 executing on the programmable processor 50, which is communicatively coupled to the master receiver 22, first receiver 32 and second receiver 42.

At block 402, a first phase integer set for a first baseline formed between the master antenna and the first antenna is generated. The first phase integer set comprises an array of k values for the carrier frequency received from each of the satellites that are within range of the master antenna and the first antenna. In one implementation of this embodiment, the programmable processor 50 generates the first phase integer set for the first baseline $D_1$ formed between the master antenna 20 and the first antenna 30. An exemplary phase integer set for the first baseline $D_1$ for the carrier frequency received from the satellites 100, 102, 104 is the vector $(k_1^{100}, k_1^{102}, k_1^{104})$. As defined herein, $k_i^n$ is the k value determined for a baseline at the carrier frequency $v_c$ of the signal 200 received from the $n^{th}$ satellite at the $i^{th}$ antenna.

At block 404, an estimated first baseline vector for the first baseline is generated based on the first phase integer set. The estimated first baseline vector is estimated based on the k-vector, such exemplary k-vector $(k_1^{100}, k_1^{102}, k_1^{104})$, as is known by one of ordinary skill in the art and as discussed in the Teunissen paper. In one implementation of this embodiment, the programmable processor 50 executes instructions 120 to estimated first baseline vector, which is associated with the first baseline vector 151, based on the first phase integer set. In this case, the estimated first baseline vector is an estimate of the length and direction of the first baseline vector 151.

At block 406, a second phase integer set for a second baseline formed between the master antenna and the second antenna is generated. The second phase integer set comprises an array of k values for the carrier frequency received from each of the satellites that are within range of the master antenna and the second antenna. In one implementation of this embodiment, the programmable processor 50 generates the second phase integer set for the second baseline $D_2$ formed between the master antenna 20 and the second antenna 40. An exemplary phase integer set for the second baseline $D_2$ for the carrier frequency received from the satellites 100, 102, 104 is the k-vector ($k_2^{100}$, $k_2^{102}$, $k_2^{104}$) formed from the k values.

At block 408, an estimated second baseline vector for the second baseline $D_2$ is generated based on the second phase integer set. The second baseline vector is estimated based on the k-vector, such exemplary k-vector ($k_1^{100}$, $k_1^{102}$, $k_1^{104}$). In one implementation of this embodiment, the programmable processor 50 executes instructions 120 to estimated second baseline vector, which is associated with the second baseline vector 152, based on the first phase integer set. In this case, the estimated second baseline vector is an estimate of the length and direction of the second baseline vector 152.

At block 410, a fixed baseline vector is generated by retrieving a length $D_{fix}$ of the fixed baseline between the first antenna 30 and the second antenna 40. In one implementation of this embodiment, the programmable processor 50 retrieves the length $D_{fix}$ of the fixed baseline between the first antenna 30 and the second antenna 40 from the memory 22 and uses information indicative of the global positioning of the first antenna 30 with respect to the global positioning of the second antenna 40 to generate a direction from the first antenna 30 to the second antenna 40. The programmable processor 50 then generates the fixed baseline vector 150.

At block 412, the phase integers of the first phase integer set and the second phase integer set are verified, based on a summation of the estimated first baseline vector, the estimated second baseline vector, and the fixed baseline vector 150. Referring now to the exemplary configuration of antennae in FIG. 1, the first baseline vector 151, the second baseline vector 152, and the fixed baseline vector 150 form a closed triangle 155. In this implementation, the programmable processor 50 uses the fixed baseline 150 and the phase integers of the first phase integer set ($k_2^{100}$, $k_2^{102}$, $k_2^{104}$) and the second phase integer set ($k_1^{100}$, $k_1^{102}$, $k_1^{104}$) to trigonometrically verify which of the k values in the first and second phase integer sets sum to form the closed triangle. With $D_1$ vectorially representing the first baseline vector 151 from the master antenna 20 to the first antenna 30, $D_{fix}$ vectorially representing the fixed baseline vector 150 from the first antenna 30 to the second antenna 40, and $D_2$ vectorially representing the second baseline vector 152 from the second antenna 40 to the master antenna 20, the sum to form the closed triangle is written as the equation is $D_1+D_{fix}+D_2=0$.

At block 414, a relative position between the master antenna and at least one of the second antenna and the second antenna is calculated based on the verification of the phase integers. In one implementation of this embodiment, the programmable processor 50 executes instructions 120 to calculate the relative position between the master antenna 20 and the first antenna 30. In another implementation of this embodiment, the programmable processor 50 executes instructions 120 to calculate the relative position between the master antenna 20 and the second antenna 40. In yet another implementation of this embodiment, the programmable processor 50 executes instructions 120 to calculate the relative position between the master antenna 20 and both the first antenna 30 and the second antenna 40. Since method 400 relies on carrier frequency measurements and not on code measurement, method 400 is highly accurate. By continuously implementing method 400, the programmable processor 50 in the aircraft 130 that is landing on the aircraft carrier 134 continuously determines the relative position of the aircraft carrier 135 to within a few centimeters.

The reliability of the methods 300 and 400 can be improved with multiple Global positioning system antennae having more than one fixed baseline. In another implementation of this embodiment, the instructions 120 is the software generated in the SBJPALS or JPALS programs as described in the application Ser. No. 11/180,295.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method to determine a position of a master antenna relative to a position of at least one other antenna, the method comprising:
    generating phase carrier measurements for a carrier frequency and at least three antennae including the master antenna and the other antennae;
    generating phase integer sets based on the phase carrier measurements;
    verifying the phase integers of the generated phase integer sets based on a summation of estimated baselines and a fixed baseline between two of the other antennae; and
    calculating the position of the master antenna relative to the position of at least one other antenna based on the verified phase integer set and the fixed baseline.

2. The method of claim 1, wherein generating phase carrier measurements comprises:
    receiving a global positioning system signal at the at least three antennae;
    generating pseudo-range data and carrier phase measurements at the master receiver responsive to receiving the global positioning system signal at the master antenna; and
    generating pseudo-range data and carrier phase measurements at receivers associated with each of the other antennae responsive to the respective receiving the global positioning system signal at each of the other antennae.

3. The method of claim 2, further comprising:
    receiving pseudo-range data and carrier phase measurements from the master receiver and from the other receivers responsive to the generating of the pseudo-range data and the carrier phase measurements, wherein generating phase integer sets based on the phase carrier measurements comprises:
    processing the pseudo-range data and the carrier phase measurements generated at the at least three antennae to generate the phase integer sets.

4. The method of claim 1, wherein generating phase carrier measurements for a carrier frequency and at least three antennae comprises:
    generating phase carrier measurements for the carrier frequency and the master antenna, a first antenna and a second antenna.

5. The method of claim 4, wherein generating phase integer sets based on the phase carrier measurements comprises:
    generating a first phase integer set for a first baseline formed between the master antenna and the first antenna; and generating a second phase integer set for a second baseline formed between the master antenna and the second antenna.

6. The method of claim 5, wherein calculating the position of the master antenna relative to the position of at least one other antenna comprises:
generating an estimated first baseline vector for the first baseline, based on the first phase integer set;
generating an estimated second baseline vector for the second baseline, based on the second phase integer set;
generating a fixed baseline vector by retrieving a length of the fixed baseline between the first antenna and the second antenna;
verifying the phase integers of the first phase integer set and the second phase integer set, based on a summation of the estimated first baseline vector, the estimated second baseline vector, and the fixed baseline vector; and
calculating the position of the master antenna relative to the position of at least one of the first antenna and the second antenna based on the verification of the phase integers.

7. A system comprising:
a master antenna adapted to receive global positioning system signals from a plurality of navigational satellites;
a master receiver communicatively coupled to the master antenna, the master receiver adapted to track and demodulate the signals received at the master antenna, the master receiver further adapted to create pseudo-range data and carrier phase measurements;
at least two other antennae adapted to receive the global positioning system signals from the plurality of navigational satellites, each of the other antennae forming a baseline with the master antenna, and at least two of the other antennae form a fixed baseline with each other;
at least two other receivers communicatively coupled to a respective one of the other antennae, wherein each of the other receivers is adapted to track and demodulate the signals received at the respective antenna, each of the other receivers further adapted to create pseudo-range data and carrier phase measurements for the respective antenna; and
a programmable processor communicatively coupled to the master receiver and the other receivers, the programmable processor adapted to receive the generated pseudo-range data and carrier phase measurements from the master receiver and the other receivers, the programmable processor further adapted to generate phase integer sets based on the phase carrier measurements, adapted to verify the generated phase integer sets, and adapted to calculate a position of the master antenna relative to the position of at least one other antenna based on the fixed baseline between two of the other antennae.

8. The system of claim 7, further comprising:
the plurality of navigational satellites communicatively coupled to the master antenna and the other antennae, the navigational satellites adapted to emit signals at the carrier frequency.

9. The system of claim 7, wherein the master antenna is positioned in an aircraft.

10. The system of claim 9, wherein the other antennae are positioned on a moving vehicle.

11. The system of claim 7, wherein the other antennae are positioned on a moving vehicle.

12. The system of claim 7, wherein the master antenna is positioned in an aircraft, wherein the other antennae comprise a first antenna and a second antenna positioned on an aircraft carrier, and wherein the programmable processor is further adapted to generate a first phase integer set for a first baseline formed between the master antenna and the first antenna, to generate a second phase integer set for the second baseline formed between the master antenna and the second antenna, and to verify the first phase integer set and the second phase integer set.

13. The system of claim 7, further comprising:
a Kalman filter adapted for execution by the programmable processor.

14. The system of claim 7, further comprising:
a memory communicatively coupled to the programmable processor.

15. A program product comprising program instructions, embodied on a storage medium, that are operable to cause a programmable processor to:
generate phase carrier measurements for a carrier frequency and at least three antennae including a master antenna and other antennae;
generate phase integer sets based on the phase carrier measurements;
verify the phase integers of the generated phase integer sets based on a summation of estimated baselines and a fixed baseline; and
calculate a position of the master antenna relative to the position of at least one other antenna based on the verified phase integer set and the fixed baseline between two of the other antennae.

16. The program-product of claim 15, wherein the program instructions to generate phase carrier measurements comprise program instructions operable to cause a programmable processor to:
receive global positioning system signal at the at least three antennae;
generate pseudo-range data and carrier phase measurements at the master receiver responsive to receiving the global positioning system signal at the master antenna; and
generate pseudo-range data and carrier phase measurements at receivers associated with each of the other antennae responsive to the respective receiving the global positioning system signal at each of the other antennae.

17. The program-product of claim 16, further comprising program instructions operable to cause the programmable processor to:
receive pseudo-range data and carrier phase measurements from the master receiver and from the other receivers responsive to the generating of the pseudo-range data and the carrier phase measurements; and wherein the program instructions operable to cause the programmable processor to generate phase integer sets based on the phase carrier measurements comprises program instructions operable to cause the programmable processor to:
process the pseudo-range data and the carrier phase measurements generated at the at least three antennae to generate the phase integer sets.

18. The program-product of claim 15, wherein the program instructions to generate phase carrier measurements comprise program instructions operable to cause a programmable processor to:
generate phase carrier measurements for the carrier frequency and the master antenna, a first antenna and a second antenna.

19. The program-product of claim 18, wherein the program instructions to generate phase integer sets comprise program instructions operable to cause a programmable processor to:

generate a first phase integer set for a first baseline formed between the master antenna and the first antenna; and generate a second phase integer set for a second baseline formed between the master antenna and the second antenna.

20. The program-product of claim 19, wherein the program instructions to calculate the position of the master antenna relative to the position of at least one other antenna comprise program instructions operable to cause a programmable processor to:

generate an estimated first baseline vector for the first baseline, based on the first phase integer set;

generate an estimated second baseline vector for the second baseline, based on the second phase integer set; and generate a fixed baseline vector by retrieving a length of the fixed baseline between the first antenna and the second antenna wherein the program instructions to verify the phase integers of the generated phase integer sets based on a summation of estimated baselines and a fixed baseline further comprise program instructions operable to cause a programmable processor to:

verify the phase integers of the first phase integer set and the second phase integer set, based on a summation of the estimated first baseline vector, the estimated second baseline vector, and the fixed baseline vector; and calculate the position of the master antenna relative to the position of at least one of the first antenna and the second antenna based on the verification of the phase integers.

* * * * *